(12) United States Patent
Sang et al.

(10) Patent No.: US 9,037,089 B2
(45) Date of Patent: May 19, 2015

(54) MULTI-RADIO COEXISTENCE

(71) Applicant: Broadcom Corporation, Irvine, CA (US)

(72) Inventors: Aimin Sang, San Diego, CA (US); Kamesh Medapalli, San Jose, CA (US)

(73) Assignee: BROADCOM CORPORATION, Irvine, CA (US)

( * ) Notice: Subject to any disclaimer, the term of this patent is extended or adjusted under 35 U.S.C. 154(b) by 227 days.

(21) Appl. No.: 13/677,211

(22) Filed: Nov. 14, 2012

(65) Prior Publication Data

US 2014/0120969 A1 May 1, 2014

Related U.S. Application Data

(60) Provisional application No. 61/721,401, filed on Nov. 1, 2012.

(51) Int. Cl.
*H04B 1/00* (2006.01)

(52) U.S. Cl.
CPC ...................................... *H04B 1/406* (2013.01)

(58) Field of Classification Search
CPC .. H04W 88/06; H04W 84/12; H04W 72/1215
USPC ............... 455/63.1, 114.2, 296, 41.2, 522.15; 370/310, 338
See application file for complete search history.

(56) References Cited

U.S. PATENT DOCUMENTS

| | | | | |
|---|---|---|---|---|
| 7,630,687 | B2* | 12/2009 | Madhavan et al. | 455/63.1 |
| 8,134,992 | B1* | 3/2012 | Nam et al. | 370/345 |
| 8,200,161 | B2* | 6/2012 | Walley et al. | 455/63.1 |
| 8,340,580 | B1* | 12/2012 | Epstein | 455/63.1 |
| 8,442,434 | B2* | 5/2013 | Grushkevich et al. | 455/41.2 |
| 8,554,270 | B2* | 10/2013 | Desai et al. | 455/552.1 |
| 2010/0330977 | A1* | 12/2010 | Kadous et al. | 455/419 |

* cited by examiner

*Primary Examiner* — Sonny Trinh
(74) *Attorney, Agent, or Firm* — Foley & Lardner LLP; Christopher J. McKenna; Paul M. H. Pua

(57) ABSTRACT

A method and apparatus relate to coexistence of multiple RF subsystems on a communication device. An apparatus may include a plurality of radio frequency (RF) subsystems configured to receive or transmit communication signals; and an interference table indicative of zones of interference among the multiple RF subsystems, the zones of interference being based on RF measurements. At least one of the RF subsystems comprises a coexistence module configured to communicate coexistence-related messages with of the other RF subsystems, the coexistence-related messages being based on the zones of interference.

20 Claims, 5 Drawing Sheets

MULTI-RADIO COEXISTENCE

TECHNICAL FIELD

The technical field of the present disclosure relates to mobile wireless communication devices, and in particular, to addressing interference among multiple radio technologies.

BACKGROUND

A wireless communication device, such as a cellular telephone, two-way radio, personal digital assistant (PDA), personal computer (PC), laptop computer, home entertainment equipment, radio frequency (RF) identification (RFID) reader, RFID tag, etc. may communicate directly or indirectly with other wireless communication devices. Such communication devices, which may be mobile and/or stationary, may include a plurality of wired and/or wireless interfaces to enable use of various standards for communicating data. For example, mobile devices may enable cellular connectivity through mobile technologies, such as Global System for Mobile Communications (GSM), General Packet Radio Service (GPRS), Enhanced Data Rates for GSM Evolution (EDGE), Universal Mobile Telecommunications System (UMTS), Code Division Multiple Access 2000 (CDMA2000), and Long Term Evolution (LTE), as well as interfaces to communicate using additional technologies, such as Bluetooth, Wireless local area networks (WLAN), Worldwide Interoperability for Microwave Access (WiMAX) and Global Navigation Satellite Systems (GNSS) such as GPS, GLONASS or Galileo.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

In order to provide users the freedom to communicate, transmit and receive data, through various communication links and networks, wireless communication devices have evolved from utilizing, e.g., a single communication standard (and associated band(s)) to utilizing multiple radio transceivers and antennas that operate using multiple standards and multiple bands, e.g., dual-band, tri-band, and quad-band devices. For example, a cellular telephone may have traditional cellular voice capabilities by operating on, e.g., a GSM band or a CDMA band, while also having the ability to engage in Bluetooth® and WiFi™ communications.

Figure 1:
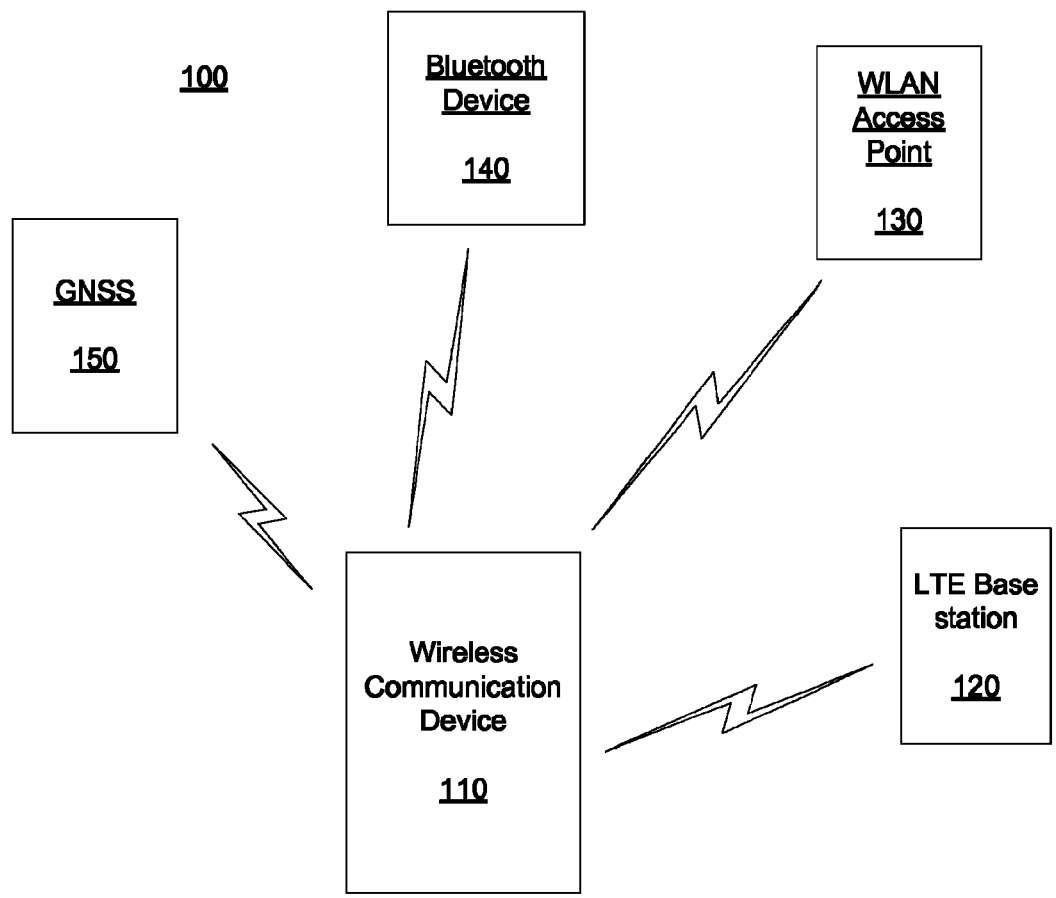
FIG. 1 is an example schematic representation of a communication environment for a communication device.

FIG. 1 illustrates an example communication environment 100 comprising a communication device 110 that is operable to support a plurality of wireless interfaces and capable of electronic communication with other entities. As illustrated in FIG. 1, the communication device 110 may be capable of communicating with an LTE base station 120 for cellular voice and/or data communication. Of course, those skilled in the art will appreciate that the LTE base station 120 may be replaced with nodes for other cellular technologies (e.g., CDMA, Wideband CDMA (WCDMA), CDMA1000, High-Speed Downlink Packet Access (HSDPA), GSM, GPRS, EDGE, and UMTS). The communication device 110 may also be capable of communicating with a wireless local area network (WLAN) access point 130 to connect to, for example, other devices connected to the WLAN. Additionally, the communication device 110 may be capable of communicating with a Bluetooth (BT) device 140. In this regard, the communication device 110 and the BT device 140 may communicate directly with each other via the Bluetooth protocol. Also, as illustrated in FIG. 1, the communication device 110 may be capable of receiving signals from a global navigation satellite system (GNSS) unit 150, such as a Global Positioning Satellite (GPS). Of course, the communication device 110 may be configured and capable of communicating with other devices, such as WiMAX, etc., that are not illustrated in FIG. 1.

The communication device 110 can include suitable logic, circuitry, interfaces and/or code that may enable communications via a plurality of wireless interfaces, utilizing one or more radio transceivers, as described in greater detail below with reference to FIG. 2. The communication device 110 may be operable to execute various tasks and/or applications requested by a user of the communication device 110. Such tasks and/or applications may require interaction with one or more other entities, such as those illustrated in FIG. 1, via one or more wireless interfaces.

Thus, the communication device 110 may enable connectivity via a plurality of available networks and/or wireless interfaces, which may be desirable to perform requested tasks. During wireless communication by the communication device 110, RF signals may be transmitted and/or received to facilitate data communication and/or signaling utilizing one or more of the supported wireless interfaces in the communication device 110 and utilizing one or more RF subsystems that enable use of one or more antenna to facilitate the RF communications. For example, during communication between the communication device 110 and the BT device 140, Bluetooth RF signals comprising voice, video and/or data packets may be communicated between the communication device 110 and the BT device 140. Similarly, the communication device 110 may be operable to perform WLAN, cellular and/or other types of RF communication with the WLAN access point 130, the LTE base station 120 or other devices, respectively, which are supported by the communication device 110.

Each type of RF communication is subject to specific RF protocol requirements. For example, WLAN RF communication based on the 802.11 protocol requirements may be performed only at specific frequency bands, for example the 2.4 GHz and/or 5 GHz bands. Bluetooth RF communication may also occur in the 2.4 GHz band. Because some of the frequency bands utilized by various wireless interfaces may overlap, simultaneous communication based on the wireless communication protocols may be limited by interference caused by use of the same and/or adjacent frequencies. For example, Bluetooth RF transmission at about 2.4 GHz via the communication device 110 may cause interference with 802.11 based RF reception in the communication device 110 where the 802.11 RF signals are transmitted by a source device within the 2.4 GHz band.

In various embodiments, the communication device 110 can be configured to provide for coexistence of concurrent RF communication by the communication device 110. Coexistence solutions enable multiple RF subsystems to operate within the same device, such as the communication device 110. The coexistence may be based on the existence and/or use of sufficient isolation between the RF subsystems preventing or limiting interference caused by an RF subsystem to other RF subsystems such that concurrent RF transmission and/or reception operations may be performed without any additional processing and/or management. Coexistence may also be based on time domain based techniques, using, for example, arbitration based scheduling.

Figure 2:
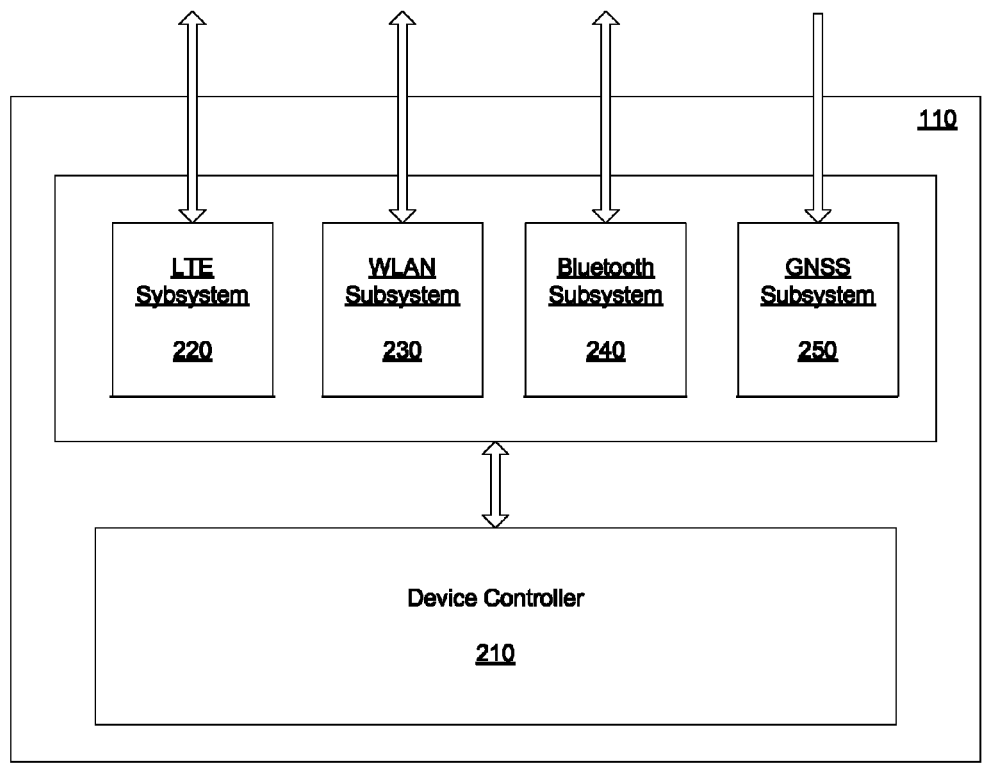
FIG. 2 is a schematic illustration of an example communication device.

Referring now to FIG. 2, an example embodiment of the communication device 110 is schematically illustrated. As illustrated in FIG. 2, the communication device 110 includes a device controller 210 and a plurality of RF subsystems (i.e. LTE subsystem 220, WLAN subsystem 230, Bluetooth subsystem 240, and/or GNSS subsystem 250). Of course, those skilled in the art will understand that the communication device 110 may include numerous other components which are not illustrated in FIG. 2 for sake of simplicity. For example, the communication device 110 may include one or more antenna, memory, power system, etc. The device controller 210 may comprise suitable logic, circuitry, interfaces and/or code that may be operable to provide management and/or control functionality of the communication device 110 to support RF transmission and/or reception operations during communication through one or more of the plurality of RF subsystems. In this regard, the device controller 210 may include a central processor, a memory and various other components.

The RF subsystems may include wireless interfaces which facilitate wireless communication for specific protocols. For example, the LTE subsystem 220 can comprise an interface for communication with an LTE base station. Similarly, the WLAN subsystem 230, Bluetooth subsystem 240, and GNSS subsystem 250 may comprise interfaces for communication with WLAN, Bluetooth, and GNSS devices, respectively. The RF subsystems (i.e. LTE subsystem 220, WLAN subsystem 230, Bluetooth subsystem 240, and/or GNSS subsystem 250) may include various other components, such as an antenna, and may be operable to perform RF transmission and/or reception of signals comprising data and/or control packets for the various wireless communication protocols. The device controller 210 may be operable to control and/or manage the operations of the various RF subsystems.

As illustrated in FIG. 2, the device controller 210 can be communicatively connected to the RF subsystems (i.e. LTE subsystem 220, WLAN subsystem 230, Bluetooth subsystem 240, and/or GNSS subsystem 250). Further, the various RF subsystems may be communicatively connected directly or indirectly to each other.

Figure 3:
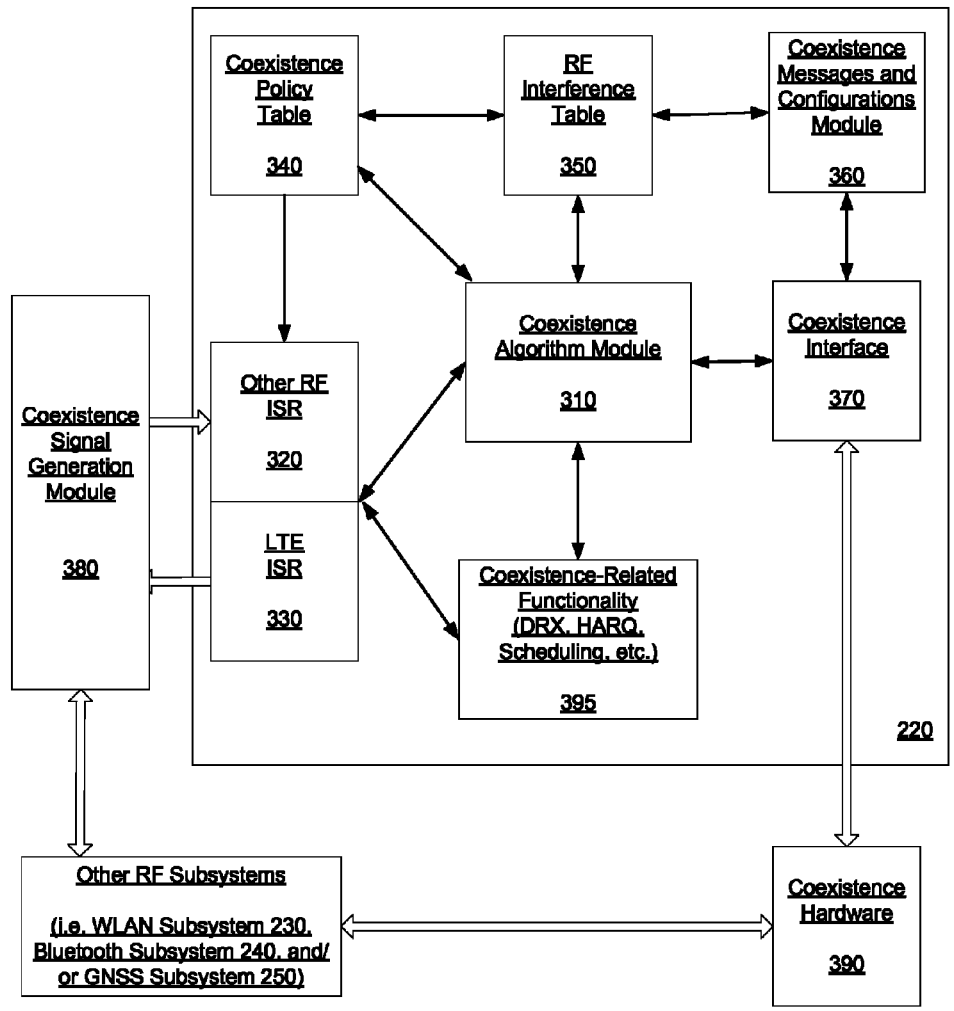
FIG. 3 is a schematic illustration of an example LTE component of the communication device of FIG. 2.

In accordance with certain embodiments, a framework can be provided to allow coexistence of the multiple RF subsystems on the same communication device. In this regard, the RF subsystems may be configured with a cross-layer partition of measurement-based coexistence modules. Specifically, each of the RF subsystems (i.e. LTE subsystem 220, WLAN subsystem 230, Bluetooth subsystem 240, and GNSS subsystem 250) may be so configured. For illustration purposes, the LTE subsystem 220 is illustrated in FIG. 3. Each of the other RF subsystems (i.e. WLAN subsystem 230, Bluetooth subsystem 240, and/or GNSS subsystem 250) may be similarly configured.

Referring now to FIG. 3, an example embodiment of the LTE subsystem 220 of the communication device of FIG. 2 is schematically illustrated. Of course, those skilled in the art will understand that the LTE subsystem 220 may contain additional components not shown in FIG. 3 for purposes of simplicity. Further, the various components illustrated in FIG. 3 may be implemented in hardware or in firmware.

The LTE subsystem 220 can comprise a coexistence algorithm module 310 that is configured to manage the coexistence of the LTE subsystem 220 with the other RF subsystems (i.e. WLAN subsystem 230, Bluetooth subsystem 240, and/or GNSS subsystem 250). In this regard, the LTE subsystem 220 may receive coexistence signals from the other RF subsystems (i.e. WLAN subsystem 230, Bluetooth subsystem 240, and/or GNSS subsystem 250) through a coexistence signal generation module 380. In various embodiments, the coexistence signal generation module 380 may be a general purpose input/output (GPIO) module. In other embodiments, the coexistence signal generation module 380 may be another type of interface, such as a proprietary interface.

Realtime signals to and from the coexistence signal generation module 380 may be handled within the LTE subsystem 220 by the appropriate interrupt subroutines (ISRs). Incoming non-LTE messages (i.e. messages from the coexistence signal generation module 380 to the LTE subsystem 220 related to an RF subsystem other than the shown LTE system 220) can be received by a non-LTE ISR 320. In this regard, the non-LTE ISR 320 may be further divided to separately handle messages from the coexistence signal generation module 380 related to the WLAN subsystem 230 or messages from the coexistence signal generation module 380 related to the BT subsystem 240. Similarly, delivery of LTE-related coexistence messages to the coexistence signal generation module 380 may be handled by an LTE ISR 330.

The coexistence messages handled by the non-LTE ISR 320 and the LTE ISR 330, as well as similar ISR's in the other RF subsystems (i.e. WLAN subsystem 230, Bluetooth subsystem 240), can be formatted as 8-bit messages in which the first three bits indicate a signal type. Signaling between the LTE subsystem 220 and the GNSS subsystem 250 may be achieved via pulse signals indicating blanking of the power amplifier of the LTE subsystem 220 or fine-time assistance. Referring again to the 8-bit coexistence message format, the remaining five bits could be used for message payload. Table 1 below indicates one embodiment of the usage of the first three bits to indicate the message signal type:

TABLE 1

| Message Type Indicator | Direction | Message Type |
|---|---|---|
| 0 | LTE <-> BT/WLAN | Real Time Signal Message |
| 1 | LTE <-> BT/WLAN | Transport Control Message |
| 2 | LTE <-> BT/WLAN | Transparent Data Message |
| 3 | LTE -> BT/WLAN | LTE Inactivity Duration Message |
|   | BT -> LTE | reserved |
| 4 | LTE -> BT | LTE Scan Frequency Message |
|   | BT -> LTE | reserved |
| 5 | LTE -> BT | reserved |
|   | BT -> LTE | reserved |
| 6 |   | Vendor Specific |
| 7 |   | Vendor Specific |

The five bits comprising the message payload of the coexistence message may differ depending on the direction of the message. For messages being sent from the LTE subsystem 220 (e.g., through the LTE ISR 330) to the coexistence signal generation module 380, the payload portion of the message may be formatted as follows:

| FRAME_SYNC | LTE_RX | LTE_TX | LTE_PATTERN[0] | LTE_PATTERN |

Conversely, messages being received by the LTE subsystem 220 (e.g., through the non-LTE ISR 320) from the coexistence signal generation module 380 may indicate the coexistence condition of the other RF subsystems (i.e. WLAN subsystem 230, Bluetooth subsystem 240, and/or GNSS subsystem 250). The payload portion of these message may be formatted as follows:

| BT_RX_PRIORITY | BT_TX | WLAN_RX_PRIORITY | WLAN_TX | Reserved |
|---|---|---|---|---|

Thus, using a message formatting as described above, the LTE subsystem 220 can intelligently coexist with the other RF subsystems.

In certain embodiments, the message can be formatted as a multi-byte message to provide enhanced real-time (RT) signaling and non-real-time (NRT) messaging. In this regard, the messages may contain an enhanced payload that is an additional 8-bit, 16-bit or more in length. Table 2 below provides a listing of messages, along with any additional payload length, in accordance with an embodiment.

TABLE 2

| IDs of coex Real Time signals/Non-Real Time messages | Definition | Implementation cases and policies | Payload (b3 and following bits) parameter's encoding |
|---|---|---|---|
| LTE_RX_PRIORITY | A RT signal indicating LTE_RX_PRIORITY, and also the holding period from LTE to other IPs. It should be generated in replacement of or back-to-back with ISM_RX_PRIORITY. | LTE_RX_PRIORITY value (1 bit): b4: same as LTE_RX_PRIORITY Event ID (b8): b8 = 0---LTE best-effort data reception; =1---LTE control channel or mission critical data reception Holding period (15 bits) in ms plus residual symbols: bit 12:9: $0\sim(2^4-1)$ in OFDM symbols for the sub-1 ms time. (14 symbols in 1 ms). bit 23:12: $0\sim(2^{11}-1)$ in ms | An extra 16-bit (b8~b23) payload for RT signal---used to replace or enhance the BT SIG LTE_RX_PRIORITY. |
| LTE_TX | A RT signal indicating LTE_TX, and also the holding period from LTE to other IPs. It should be generated in replacement of or back-to-back with LTE_TX. | LTE_TX value (1 bit): Bit 5 = 1 or 0: same as LTE_TX Holding period (16 bits) in ms and OFDM symbols:[1] Bit 11:8: $0\sim(2^4-1)$ in OFDM symbols Bit 23:12: $0\sim(2^{12}-1)$ in ms | An extra 16-bit (b8~b23) for RT signal---used to replace or enhance the BT SIG LTE_TX. |
| BT_RX_PRIORITY | A RT signal indicating BT_RX_PRIORITY, and also the triggering event ID from BT to LTE. It should be generated in replacement of or back-to-back with BT_RX_PRIORITY. | BT_RX_PRIORITY value (1 bit): b3 = 1 or 0: same as BT_RX_PRIORITY Event ID (bit 10:8): 1. BT connection setup: paging/inquiry/scan-response 2. BT eSCO degrades 3. BT severe performance degradation 4. Reserved Holding period (bit 15:11) in BT slots (625us per slot): $0\sim(2^5-1)$ | An extra 8-bit (b8~b15) payload for RT signal---used to replace or enhance the BT SIG BT_RX_PRIORITY. |

TABLE 2-continued

| IDs of coex Real Time signals/Non-Real Time messages | Definition | Implementation cases and policies | Payload (b3 and following bits) parameter's encoding |
|---|---|---|---|
| WLAN_RX_PRIORITY | A RT signal indicating WLAN_RX_PRIORITY, and also the triggering event ID from WLAN to LTE. It should be generated in replacement of or back-to-back with WLAN_RX_PRIORITY. | WLAN_RX_PRIORITY value (1 bit): b5 = 1 or 0: same as WLAN_RX_PRIORITY Band Information (b8): b8: ISM band (=1) or U-NII band (=0). Event ID (3 bits---bit 11:9): 1. Probe/Assoc response 2. EAP/RSNA 3. Throughput low (due to Coex rather than native signal quality) 4. Other delay-sensitive and mission critical WLAN signals 5. Reserved Holding period (12 bits---bit 23:12) in 2-us unit: $0\sim(2^{12}-1)$ | An extra 16-bit payload (b8~b23) for RT signal---used to replace or enhance the BT SIG WLAN_RX_PRIORITY. If two WLAN bands are operating at the same, we need two separate WLAN_TX_ON signals. |
| BT_TX_ON | A RT signal indicating BT_TX_ON, and also the holding period from BT to LTE. It should be generated in replacement of or back-to-back with BT_TX_ON. | BT_TX_ON value (1 bit): b4 = 1 or 0: same as BT_TX_ON Holding period (bit 15:8) in BT slots: $0\sim(2^{8}-1)$ | An extra 8-bit (b8~b15) payload for RT signal---used to replace or enhance the BT SIG BT_TX_ON. |
| WLAN_TX_ON | A RT signal indicating WLAN_TX_ON, and also the holding period from WLAN to LTE. It should be generated in replacement of or back-to-back with WLAN_TX_ON. | WLAN_TX_ON value (1 bit): b6 = 1 or 0: same as WLAN_TX_ON Band Information (b8): b8: ISM band (=1) or U-NII band (=0). Holding period (15 bits or bit 23:9) in 2-us unit: $0\sim(2^{15}-1)$ | An extra 16-bit (b8~b23) payload for RT signal---used to replace or enhance the BT SIG WLAN_TX_ON. If two WLAN bands are operating at the same, we need two separate WLAN_TX_ON signals. |
| LTE_INACTIVITY_DURATION | Sent by LTE when LTE goes to sleep for a known period of time ≥4 ms. It shall be treated as a "timing critical" NRT message. The starting "offset" (look-ahead) is ~0.5 ms from the moment the signal reaches WLAN/BT, though Error! Reference source not found. says 0 offset. | Sleep period of 5 bits (b7:b3): = {0:31}: in unit of [2 ms] where 0_means that the inactivity time is indefinite. Sleep time is given in multiples of 2 ms in {2~64 ms}. | LTE_RX_Priority and LTE_TX can still be sent during this duration to as a preemptive LTE "wake-up" signal. LTE can signal this to WLAN/BT late than actual rather than the other way. The actual inactivity duration can also be shortened by LTE_TX and LTE_RX_Priority. |
| LTE_SCAN_FREQUENCY | Sent by an active or just-power-on LTE to indicate its action to start scanning, on which frequency, and for how long. It is used for both time-critical (HO) scanning, when WLAN/BT shall treat it as high-priority mission critical, and for non-so-time-critical (initial) scanning, when it can wait briefly for WLAN/BT to halt their TX. | LTE scan starting request---target scan frequency index of 5 bits (b7:b3) (if b15:b13 = 0): ={0:31} unsigned integer, frequency index to scan Or LTE scan result--- result of frequency index of 5 bits (b7:b3) (if b15:b13 != 0): ={0:31} unsigned integer, index of new frequency for UE to switch over LTE scan period (b8:b11)---valid when (b7:b3 != 0): = 0~15 (in ms) | An extra payload of 8 bits (b8:b11) signaling the scan type and period (in ms) during which LTE parks on the signaled frequency, and/or scan results if scan ended. A non-zero value indicates the LTE scan frequency index, representing the frequency closest to the WLAN/BT band. The table for scan frequency index is passed down by HCI[/Coex]_Set_LTE_Scan_Freq_Table_Req. LTE_RX_Priority or LTE_TX can still be sent during this duration to as a preemptive LTE signal. WLAN/BT can send LTE_SCAN_RSP to ack/nack the non-time-critical (initial) scanning on the selected frequency---LTE scanning can pause or skip this frequency for the mement. |

TABLE 2-continued

| IDs of coex Real Time signals/Non-Real Time messages | Definition | Implementation cases and policies | Payload (b3 and following bits) parameter's encoding |
|---|---|---|---|
| | | LTE scan type (b12) = 0: time-critical (HO) scanning and WLAN/BT has to shutdown its PA immediately. = 1: non-time-critical (initial) scanning, and WLAN/BT can send LTE_SCAN_RSP back to deny it. Scan Done or Scan Request (b15:b13): 0: this signal is for scan starting request Non-zero (1~7): this signal is the new (TDD frame configure number + 1, i.e., 0~6) after scanning (valid for TDD only) | |
| LTE_SCAN_RSP | Sent by an active WLAN/BT on mission-critical communications to indicate its ACK or NACK to the LTE's scan request LTE_SCAN_REQ. Note that BT SIG has not defined the BT->LTE signals for scanning. | LTE Scan Response (b3): = 1 ACK: LTE scan of the specified frequency is OK (WLAN/BT isn't/won't be interfering) = 0 NACK: LTE scan of the specified frequency is NOT OK because WLAN/BT has to finish some mission-critical transmission for a period of time below. WLAN/BT remaining transmission time before LTE can scan the specified frequency (b7:b4): = 0~15 (in ms) | A BT SIG message that is not defined but may be used. A non-zero value indicates the LTE scan frequency index, representing the frequency closest to the ISM band. The table for scan frequency index is passed down by HCI[/Coex]_Set_LTE_Scan_Freq_Table_Req. LTE_RX_Priority or LTE_TX can still be sent during this duration to as a preemptive LTE signal. |

As described in further detail below, the coexistence algorithm module 310 can be configured to access a coexistence policy table 340 and an RF interference table 350 to resolve or avoid coexistence issues. These tables may be implemented as software or firmware and are described in further detail below. An example of a coexistence policy table 340 is provided below in Table 3, and an example RF interference table 350 is provided below in Table 4. As illustrated in FIG. 3, in one embodiment, the coexistence policy table 340 and the RF interference table 350, as well as a coexistence messages and configurations module 360, can be provided on the LTE subsystem 220. In one embodiment, corresponding tables can also be provided in each of the other RF subsystems (i.e. WLAN subsystem 230, Bluetooth subsystem 240, and/or GNSS subsystem 250).

The coexistence policy table 340 may be populated for each possible coexistence scenario and may indicate conditions for simultaneous operation of multiple RF subsystems. In particular, the table 340 may include policies for receiving and/or transmitting to or from any two or more of the RF subsystems in the communication device 110. An example coexistence policy table is partially provided below as Table 3. It should be noted that the table may provide policies separately for configurations in which WLAN is on the industrial, scientific and medical (ISM) band and on the Unlicensed National Information Infrastructure (U-NII) band.

TABLE 3

| | | | |
|---|---|---|---|
| I. (LTE, WLAN) | A. (Tx, Rx) | | Only if proper LTE_TX look-ahead time to prevent WLAN from a spiral downward Tx rate adjustment |
| | B. (Rx, Tx) | | Only if WLAN is transmitting ACK/NULL during LTE non-PDCCH reception period, or when LTE_RX has a proper or necessary look-ahead time |
| | C. (Tx, Tx) | | If the timing requirement is satisfied. As used herein, the timing requirement of each signal refers to a proper delay and jitter as may be needed by the coexisting devices. |

TABLE 3-continued

| | | |
|---|---|---|
| | D. (Rx, Rx) | If the timing requirement is satisfied |
| | E. (FDD Tx/Rx, Tx) | Only if I.B. and I.C. are satisfied, and (LTE, WLAN) is not the case where LTE Band 7 is normally not desensed by WLAN Tx, except when WLAN's Tx on 2422/2427 MHz and LTE Tx at 2545 Mhz incurs IM3 desense (of 2.5 dB) to LTE Rx at 2665 MHz. |
| | F. (FDD Tx/Rx, Rx) | If and only if I.A. and I.D are satisfied. |
| II. (LTE, BT) | A. (Tx, Rx) | Only if the timing requirement is satisfied, and BT is not doing paging/inquiry/scanning and BT adopts a proper AFH algorithms |
| | B. (Rx, Tx) | Only if the timing requirement is satisfied, and BT adopts a power profile that demands a much lower Tx power than LTE and BT adopts proper AFH algorithms to stay away from LTE band and active subcarriers |
| | C. (Tx, Tx) | If the timing requirement is satisfied |
| | D. (Rx, Rx) | If the timing requirement is satisfied |
| | E. (FDD Tx/Rx, Rx) | If and only if II.A. and II.D. are both satisfied. |
| | F. (FDD Tx/Rx, Tx) | If and only if II.B. and II.C. are both satisfied. |
| III. (LTE, GNSS) | A. (Tx, Rx) | Only if GNSS Rx under certain mission-critical conditions is doable |
| | B. (Rx, Rx) | Unconditionally allowed. |
| | C. (FDD Tx/Rx, Rx) | Only if III.A. is satisfied. |
| IV. (WLAN, BT) | A. (Tx, Rx) | Configuration not allowed. |
| | B. (Rx, Tx) | Only when BT adopts proper AFH and BT's transmission power profile enables low TX interference to WLAN |
| | C. (Tx, Tx) | Only when BT's remote peer is not impacted by the WLAN TX in proximity, and BT or WLAN's transmission won't saturate the others' PA, e.g., the collocated BT PA's linearity is not severely impaired (saturated) by WLAN PA either. |
| | D. (Rx, Rx) | Only if the peering/remote BT device is not impacted by remote WLAN's PA in proximity. |
| V. (LTE, WLAN, BT) with WLAN on ISM band | A. Any case in I. | If BT is idle. |
| | B. Any case in II. | If WLAN is idle. |
| | C. (Rx, Rx, Rx) | If and only if I.D., II.D. and IV.D are all satisfied. |
| | D. (Tx, Rx, Rx) | If and only if I.A., II.A. and IV.D. are all satisfied. |
| | E. (Tx, Tx, Tx) | If and only if I.C., II.C. and IV.C. are all satisfied. |
| | F. (Tx, Rx, Tx) | If and only if I.A., II.C. and IV.B are all satisfied. |
| | G. (Tx, Tx, Rx) | Based on IV.A., configuration not allowed. |
| | H. (Rx, Rx, Tx) | If and only if I.D, II.B and IV.B are all satisfied. |
| | I. (Rx, Tx, Tx) | If and only if I.B, II.B. and IV.C are all satisfied. |
| | J. (Rx, Tx, Rx) | Based on IV.A., configuration not allowed. |
| | K. (FDD Tx/Rx, Rx, Rx) | If and only if I.F., II.E., and IV.D. are all satisfied. |
| | L. (FDD Tx/Rx, Rx, Tx) | If and only if I.F., II.F., and IV.B. are all satisfied. |
| | M. (FDD Tx/Rx, Tx, Tx) | If and only if I.E., II.F. and IV.C. are all satisfied. |
| | N. (FDD Tx/Rx, Tx, Rx) | Based on IV.A., configuration not allowed. |
| VI. (LTE, WLAN, BT) with WLAN on U-NII band | Any composite cased in I. and II. | If and only if the intersections of I. and II. are satisfied. |
| VII. (LTE, $WLAN_{ISM}$, $WLAN_{U-NII}$, BT) (two WLAN radios active, one each on U-NII band and ISM band). | Any composite cased in I. and II. | If and only if the intersections of V. and VI. are satisfied. |
| VIII. (WLAN, BT, GNSS) | A. All cases in IV. | If and only if WLAN and BT are all on ISM bands; and if an only if WLAN and/or BT transmission will not interfere with GNSS reception. |
| | B. WLAN on U-NII 5 GHz band: | If and only if BT is not impacting GNSS reception |
| | 1. (Rx, Tx, Rx) | |
| | 2. (Rx, Rx, Rx) | Unconditionally allowed. |

TABLE 3-continued

| | | |
|---|---|---|
| | 3. (Tx, Rx, Rx) | If and only if WLAN is not impacting GNSS reception |
| | 4. (Tx, Tx, Rx) | If and only if neither WLAN nor BT is impacting GNSS reception |
| | C. WLAN active on two radios, one each on ISM and U-NII | Any composite cases of VIII.A. and VIII.B. if and only if $WLAN_{ISM}$, $WLAN_{U-NII}$, BT transmission won't interfere with GNSS reception. |
| IX. (LTE, WLAN, BT, GNSS) with WLAN on ISM band | All cases in V. | If and only if none of the transmission by LTE, WLAN and/or BT will interfere with GNSS reception. |
| IX. (LTE, WLAN, BT, GNSS) with WLAN on U-NII band | All cases in VI. | If and only if none of the transmission by LTE, WLAN and/or BT will interfere with GNSS reception. |
| XI. (LTE, $WLAN_{ISM}$, $WLAN_{U-NII}$, BT, GNSS) (two WLAN radios active, one each on U-NII band and ISM band). | All cases in VII. | If and only if none of the transmission by LTE, $WLAN_{ISM}$, $WLAN_{U-NII}$ and/or BT will interfere with GNSS reception. |

As noted above, Table 3 illustrates only a part of an example coexistence policy table. Those skilled in the art will appreciate that a complete table may have policies for each possible combination that may result in coexistence issues.

In addition to the coexistence policy table described above, additional policies may be provided in the coexistence algorithm module 310. For example, additional policies may include constant timing offset with all the real-time coexistence signals, where the offset values are either pre-defined and known to all parties or communicated to the interfering subsystem following the same encoding and messaging protocol.

The RF interference table 350 can be a measurement-based interference table with tabulated interference for all configurations. The table 350 may indicate known RF interference between the RF subsystems, indicating zones of interference among the different RF subsystems where coexistence should be triggered. A part of an example RF interference table 350 is illustrated below in Table 4:

RF interference table may include additional information, such as an indication that LTE transmission and WLAN receiving are impacting each other, for example.

In one embodiment, the RF interference table 350 can be pre-loaded on a device and fine-tuned based on real-time measurements. This fine tuning of the table may be performed by each RF subsystem based on online measurements of the RF interface.

In some embodiments, certain components may be shared by the various RF subsystems (i.e. LTE subsystem 220, WLAN subsystem 230, Bluetooth subsystem 240, and/or GNSS subsystem 250). For example, the coexistence policy table may be identical for all RF subsystems and may be shared from a common memory. Alternatively, identical copies may be provided on each RF subsystem. On the other hand, the coexistence messages and configurations module 360 may be specific to each RF subsystem, preventing sharing of this module.

The LTE subsystem 220 may further be provided with a coexistence interface 370 which can be configured to allow

TABLE 4

| | Victim | 23 dBm | 10 dBm | 0 dBm |
|---|---|---|---|---|
| WiFi | 2400 MHz | <−161.3 dBm/Hz* | <−161.3 dBm/Hz* | <−161.3 dBm/Hz* |
| | 2480 MHz | <−161.5 dBm/Hz* | <−161.5 dBm/Hz* | <−161.5 dBm/Hz* |
| WiFi | 5150 MHz | <−161.5 dBm/Hz* | <−161.5 dBm/Hz* | <−161.5 dBm/Hz* |
| | (H7) 5474 MHz | −88.0 dBm/MHz | <−161.5 dBm/Hz* | <−161.5 dBm/Hz* |
| | (H7/1RB) 5474 MHz | −73.0 dBm/MHz | −100.5 dBm/MHz | <−161.5 dBm/Hz* |
| | 5825 MHz | <−161.5 dBm/Hz* | <−161.5 dBm/Hz* | <−161.5 dBm/Hz* |
| GPS | 1575.4 MHz | −86.7 dBm/MHz | −98.2 dBm/MHz | <−163.2 dBm/Hz* |
| | (H2) 1564 MHz | −63.8 dBm/MHz | −81.4 dBm/MHz | −98.2 dBm/MHz |
| | (H2/1RB) 1569 MHz | −59.0 dBm/MHz | −71.2 dBm/MHz | −95.5 dBm/MHz |
| | 1227.6 MHz | | | |
| GLONASS | 1602.0 MHz | <−163.1 dBm/Hz* | <−163.1 dBm/Hz* | <−163.1 dBm/Hz* |
| | 1246.0 MHz | | | |
| GALILEO | 1575.4 MHz | −86.7 dBm/MHz | −98.2 dBm/MHz | <−163.2 dBm/Hz* |
| | 1191.8 MHz | | | |
| | 1278.8 MHz | | | |

In the example of Table 4, the LTE subsystem 220 is the aggressor and transmitting at 782 MHz on LTE band 13. As noted above, Table 4 is only an example and illustrates only a part of an exemplary RF interference table. A comprehensive communication between the coexistence algorithm module 310 and coexistence hardware or firmware 390 provided on the communication device 110. Similar communication between the coexistence hardware or firmware 390 and the other RF subsystems (i.e. WLAN subsystem 230, Bluetooth subsystem 240, and/or GNSS subsystem 250) is illustrated in FIG. 3.

FIG. 3 also illustrates the LTE subsystem 220 being provided with various coexistence-related functionality 395. Such functionality may include a scheduler, hybrid automatic repeat request (HARQ), discontinuous reception (DRX) or other modules that are common to or may be needed by embedded wireless systems.

Figure 4:
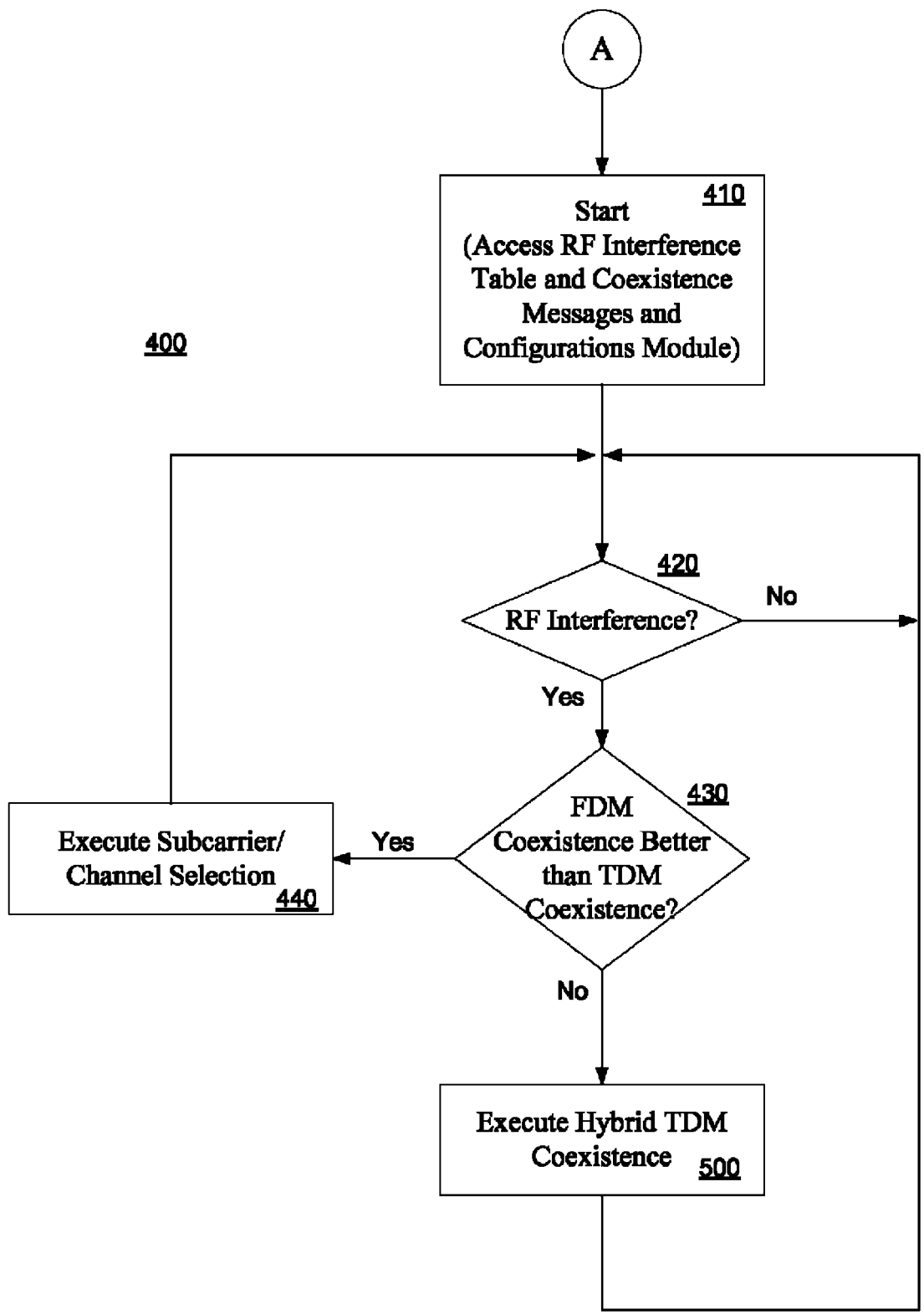
FIG. 4 is a flow chart illustrating an example coexistence process.
Figure 5:
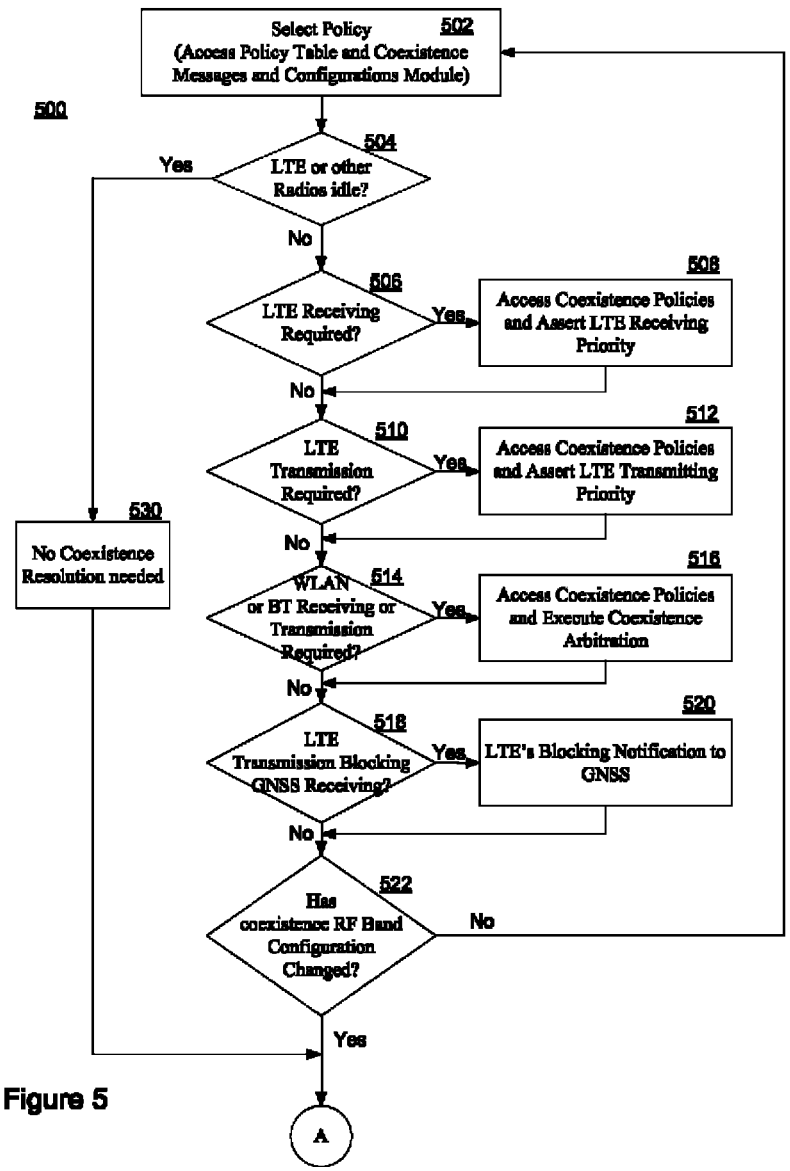
FIG. 5 is a flow chart illustrating an example hybrid time-division multiplexing (TDM) coexistence process

Referring now to FIGS. 4 and 5, an example coexistence process 400 is illustrated. In various embodiments, the process 400 may be executed by, for example, the coexistence algorithm module 310 of FIG. 3. The coexistence process 400 starts at, for example, re-boot or power up of the communication device 110 (block 410). The start process may include accessing the RF interference table 350, and/or the coexistence messages and configurations module 360. Additionally, the coexistence-related functionality 395 may be accessed for scheduling, HARQ or DRX, for example. Thus, the coexistence algorithm module 310 can be configured to obtain information related to coexistence configuration scenarios. Further, the RF interference table 350 may include offline and online measurements that can be made available to the coexistence algorithm module 310. In some embodiments, the online measurements may include channel quality indicators such as received signal strength indicator (RSSI)-type channel quality indicators or carrier-to-interference-plus-noise ratio (CINR)-type channel quality indicators. Additionally, the coexistence algorithm module 310 may receive data from the coexistence-related functionality 395, such as traffic patterns and scheduling patterns, for example.

Based on the information received during the start phase (block 410), the coexistence algorithm module 310 can determine if there is RF interference (or the possibility of such interference) between the LTE subsystem 220 and the other RF subsystems (i.e. WLAN subsystem 230, Bluetooth subsystem 240, and/or GNSS subsystem 250) (block 420). If there is no interference, the coexistence algorithm module 310 may conclude there is sufficient RF separation and no need for coexistence action. Thus, no action is taken. In some embodiments, as illustrated in FIG. 4, the coexistence algorithm module 310 may monitor for RF interference by, for example, continuing to monitor online measurements.

If the coexistence algorithm module 310 determines the existence of RF interference at block 420, it can determine the best course of action. In this regard, it may determine whether frequency domain multiplexing (FDM) or time division multiplexing (TDM) is better (block 430). This determination may be based on a variety of factors and may be made in a variety of manners. For example, the determination may use the RF interference table 350 and may be based on the RSSI of the interfering signal. If the determination is made that FDM is the superior choice, the coexistence algorithm module 310 may execute a subcarrier selection (in the case of LTE) and/or a frequency domain channel selection (in the case of BT or WLAN) to achieve increased RF separation (block 440). Otherwise, it may execute a hybrid TDM coexistence algorithm (block 500), one embodiment of which is described in greater detail with reference to FIG. 5.

Referring now to FIG. 5, the hybrid TDM coexistence algorithm 500 can be executed when the coexistence algorithm module 310 determines that FDM is not the superior choice. The hybrid TDM coexistence algorithm 500 can begin by selecting an appropriate policy from the coexistence policy table 340 illustrated in FIG. 3 (block 502). In this regard, the coexistence policy table 340 and the coexistence messages and configurations module 360 may be accessed. Additionally, the coexistence-related functionality 395 may be accessed for scheduling, HARQ or DRX, for example. As described above, the coexistence policy table 340 may be populated to accommodate each possible coexistence scenario and may include policies for receiving and/or transmitting to or from any two or more of the RF subsystems in the communication device 110. An example coexistence policy table is partially provided above as Table 3.

Referring again to FIG. 5, the coexistence algorithm module 310 can determine if either the LTE subsystem 220 and/or the other subsystems (i.e. WLAN subsystem 230, Bluetooth subsystem 240, and/or GNSS subsystem 250) are idle (block 504). In this regard, a subsystem may be considered idle if it is either (a) turned off or (b) both not receiving and not transmitting. If the LTE and/or other subsystems are idle, then the coexistence algorithm module may conclude that no RF coexistence issues exist, and no coexistence resolution is needed (block 530), and the process may return to block 410 of FIG. 4. On the other hand, if the RF subsystems are not idle (e.g., LTE and at least one other subsystem are receiving and/or transmitting), the coexistence algorithm module 310 may look to the operation of the LTE subsystem 220. If the LTE subsystem 220 requires receiving of signals (block 506), the coexistence algorithm module 310 can access the coexistence policy table 340 described above, and LTE receiving priority may be asserted (block 508). In this regard, a coexistence message may be sent, through the coexistence interface 370 or through the LTE ISR 330 of FIG. 3.

If the LTE subsystem 220 requires transmission of signals (block 510), the coexistence algorithm module 310 can access the coexistence policy table 340, and LTE transmitting priority may be asserted (block 512). Further, if the WLAN or BT subsystems (230 and 240) require receiving or transmission of signals (block 514), the coexistence algorithm module 310 can access the coexistence policy table 340 and execute a coexistence arbitration algorithm (block 516). In various embodiments, the coexistence arbitration algorithm may take different factors into account. In one embodiment, the coexistence arbitration algorithm may prioritize WLAN or BT receiving and determine whether the LTE transmitting should be turned off to avoid coexistence issues.

The coexistence impact of GNSS receiving can also be taken into account and handled by the hybrid TDM coexistence algorithm 500. In this regard, the coexistence algorithm module 500 can determine if transmission by the LTE subsystem 220 is blocking receiving of signals by the GNSS subsystem 250 (block 518). In this regard, a notification may be sent to the GNSS subsystem 250 indicating the blocking by the LTE subsystem 220 (block 520). In this condition, LTE blanking may be used to avoid coexistence issues with GNSS. The blanking may include turning off the power amplifier of the LTE subsystem 220. Additionally, the WLAN and BT subsystems may be notified of the LTE blanking. This allows the WLAN and BT subsystems (230 and 240) to take advantage of the shutdown of the LTE power amplifier.

If the coexistence configuration has changed (block 522), the coexistence algorithm module 210 may conclude that no RF interference exists, and the process may return to the start block 410 of FIG. 4.

While FIGS. 4 and 5 illustrate a sample coexistence algorithm operating in the LTE subsystem 220, those skilled in the art will understand that a similar algorithm may operate in one or more of the other RF subsystems (i.e. WLAN subsystem 230, Bluetooth subsystem 240, and/or GNSS subsystem 250).

While various embodiments of the present disclosure have been described above in the context of a wireless communication device operative in adjacent LTE and ISM bands, it should be understood that they have been presented by way of example only, and not of limitation. For example, the systems and methods described herein may be applied to the same or other communication standards operative in adjacent or otherwise coexistent frequency bands, such as certain LTE and Global Navigation Satellite Systems (GNSS) bands. It should be further understood that more or less circuitry, elements, such as radios, filters, switches, etc. may be implemented in a wireless communication device to effectuate communications over a variety of standards, protocols, etc. in accordance with various embodiments.

Likewise, the various diagrams may depict an example architectural or other configuration for the various embodiments, which is done to aid in understanding the features and functionality that can be included in embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more embodiments. As used herein, a module might be implemented utilizing any form of hardware, software, or a combination thereof. For example, one or more processors, controllers, application-specific integrated circuits (ASICs), programmable logic arrays (PLAs), programmable array logic (PALs), complex programmable logic devices (CPLDs), field-programmable gate arrays (FPGAs), logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. An apparatus, comprising:
a plurality of radio frequency (RF) subsystems configured to receive or transmit communication signals; and
an interference table indicative of zones of interference among the plurality of RF subsystems, the zones of interference being based on RF measurements,
wherein a first of the plurality of RF subsystems comprises a coexistence module configured to determine whether to apply frequency domain multiplexing (FDM) or time division multiplexing (TDM) to the first of the plurality of RF subsystems based at least on the interference table, and to communicate one or more coexistence-related messages with a second of the plurality of RF subsystems, the one or more coexistence-related messages being based on the determination and the zones of interference.

2. The apparatus of claim 1, further comprising:
a coexistence policy table indicative of conditions for simultaneous operation of two or more of the plurality of RF subsystems,
wherein the coexistence-related messages are further based on the conditions for simultaneous operation.

3. The apparatus of claim 2, wherein the coexistence module is configured to determine whether to apply FDM or TDM based at least in part on a received signal strength indication (RSSI) of an interfering signal.

4. The apparatus of claim 2, wherein the coexistence policy table is shared by two or more RF subsystems.

5. The apparatus of claim 1, wherein the interference table is regularly fine-tuned with measurements of interference among the plurality of RF subsystems.

6. The apparatus of claim 1, wherein the coexistence-related messages indicate an assertion of priority by one of the plurality of RF subsystems.

7. The apparatus of claim 1, wherein communicating coexistence-related messages comprises sending a message to the second of the plurality of RF subsystems indicating a priority assertion by the first of the plurality of RF subsystems.

8. The apparatus of claim 1, wherein communicating one or more coexistence-related messages comprises receiving a message by the first of the plurality of RF subsystems indicating a priority assertion by the second of the plurality of RF subsystems.

9. A method, comprising:
accessing an interference table indicative of zones of interference among a plurality of RF subsystems, the zones of interference being based on RF measurements;
determining, by a first RF subsystem from the plurality of RF subsystems, whether to apply frequency domain multiplexing (FDM) or time division multiplexing (TDM) to the first RF subsystem based at least on the interference table;
communicating, by the first RF subsystem with a second RF subsystem, coexistence-related messages, the coexistence-related messages being based on the determination and the zones of interference, the first RF subsystem and the second RF subsystem being configured to receive or transmit communication signals; and
performing a coexistence-related process based on the determination and the zones of interference.

10. The method of claim 9, further comprising:
accessing a coexistence policy table indicative of conditions for simultaneous operation of two or more of the plurality of RF subsystems,
wherein the coexistence-related messages are further based on the conditions for simultaneous operation.

11. The method of claim 9, further comprising:
fine-tuning the interference table based on measurements of interference among the plurality of RF subsystems.

12. The method of claim 9, wherein the coexistence-related messages indicate an assertion of priority by one of the plurality of RF subsystems.

13. The method of claim 9, wherein communicating a coexistence-related message comprises sending a message to the second RF subsystem indicating a priority assertion by the first RF subsystem.

14. The method of claim 9, wherein communicating a coexistence-related message comprises receiving a message by the first RF subsystem indicating a priority assertion by the second RF subsystem.

15. A computer program product, embodied on a non-transitory computer-readable medium, comprising:
computer code for accessing an interference table indicative of zones of interference among a plurality of RF subsystems, the zones of interference being based on RF measurements;
computer code for determining, by a first RF subsystem from the plurality of RF subsystems, whether to apply frequency domain multiplexing (FDM) or time division multiplexing (TDM) to the first RF subsystem based at least on the interference table;
computer code for communicating, by a first RF subsystem with a second RF subsystem, coexistence-related messages, the coexistence-related messages being based on the determination and the zones of interference, the first RF subsystem and the second RF subsystem being configured to receive or transmit communication signals; and
computer code for performing a coexistence-related process based on the determination and the zones of interference.

16. The computer program product of claim 15, further comprising:
computer code for accessing a coexistence policy table indicative of conditions for simultaneous operation of two or more of the plurality of RF subsystems,
wherein the coexistence-related messages are further based on the conditions for simultaneous operation.

17. The computer program product of claim 15, further comprising:
computer code for fine-tuning the interference table based on measurements of interference among the plurality of RF subsystems.

18. The computer program product of claim 15, wherein the coexistence-related messages indicate an assertion of priority by one of the plurality of RF subsystems.

19. The computer program product of claim 15, wherein communicating a coexistence-related message comprises sending a message to the at least one other RF subsystem indicating a priority assertion by the first RF subsystem.

20. The computer program product of claim 15, wherein communicating a coexistence-related message comprises receiving a message by the first RF subsystem indicating a priority assertion by one of the other RF subsystems.

* * * * *